United States Patent
Staub et al.

(10) Patent No.: US 6,324,004 B1
(45) Date of Patent: Nov. 27, 2001

(54) PLANAR PATTERNS WITH SUPERIMPOSED DIFFRACTION GRATINGS

(75) Inventors: René Staub, Cham; Wayne Robert Tompkin, Baden, both of (CH)

(73) Assignee: OVD Kingegram AG, Zug (CH)

(*) Notice: Subject to any disclaimer, the term of this patent is extended or adjusted under 35 U.S.C. 154(b) by 0 days.

(21) Appl. No.: 09/601,064

(22) PCT Filed: Jan. 21, 1999

(86) PCT No.: PCT/EP99/00388

§ 371 Date: Jul. 27, 2000

§ 102(e) Date: Jul. 27, 2000

(87) PCT Pub. No.: WO99/38039

PCT Pub. Date: Jul. 29, 1999

(51) Int. Cl.[7] .............................. G02B 5/18; B42D 15/10; B42D 209/00
(52) U.S. Cl. .......................... 359/567; 359/566; 359/575; 428/916; 283/90; 283/91; 283/93; 283/86
(58) Field of Search ................................ 283/86, 90, 91, 283/93; 428/916; 359/567, 575, 566, 569, 2

(56) References Cited

U.S. PATENT DOCUMENTS

| | | |
|---|---|---|
| 4,155,627 | 5/1979 | Gale et al. |
| 4,400,057 * | 8/1983 | Moraw et al. ...................... 359/575 |
| 5,772,248 * | 6/1998 | Phillips ................................ 283/72 |
| 5,991,078 * | 11/1999 | Yoshitake et al. .................... 359/567 |
| 6,124,970 * | 9/2000 | Karassev et al. .................... 359/485 |
| 6,271,967 * | 8/2001 | Stork .................................. 359/567 |

FOREIGN PATENT DOCUMENTS

| | | |
|---|---|---|
| 0 105 099 | 4/1984 | (EP) . |
| 0 357 837 A2 | 3/1990 | (EP) . |
| 0 360 969 A1 | 4/1990 | (EP) . |
| 0 401 466 A1 | 12/1990 | (EP) . |
| 0 201 323 B1 | 8/1994 | (EP) . |
| 0 712 012 A1 | 5/1996 | (EP) . |
| 64-3603 A | 1/1989 | (JP) . |
| WO 97/27504 | 7/1997 | (WO) . |

* cited by examiner

*Primary Examiner*—Cassandra Spyrou
*Assistant Examiner*—John Juba, Jr.
(74) *Attorney, Agent, or Firm*—Hoffman & Baron, LLP

(57) ABSTRACT

A surface pattern (1) is composed of elements (2 to 5) which are arranged in a mosaic-like fashion and of which at least one pattern is formed from a background element (4) and a pixel (2) with microscopically fine relief structures diffracting visible light. The surface elements (3) and the element portions (5) either contain the microscopically fine relief structures diffracting visible light or they comprise reflecting or scattering surfaces. Arranged in the pixel (2) is a first diffraction grating $B_1$ and arranged in the background element (4) is a second diffraction grating $B_2$, wherein the first diffraction grating $B_1$ and the second diffraction grating $B_2$ are a superimposition of at least two different, microscopically fine relief structures $F_1$ and $F_2$ diffracting visible light. The first diffraction grating $B_1$ and the second diffraction grating $B_2$ differ only by virtue of a relative phase shift $\Delta\phi$ between the relief structure $F_1$ and the relief structure $F_2$. Upon illumination with polychromatic light the pattern is of a single color which has brightness differences in zones involving different values of the phase shift $\Delta\phi$.

23 Claims, 3 Drawing Sheets

PLANAR PATTERNS WITH SUPERIMPOSED DIFFRACTION GRATINGS

BACKGROUND OF THE INVENTION

1. Field of the Invention

The invention relates to an arrangement of surfaces with an optical diffraction effect, as set forth in the classifying portion of claim 1.

Surface patterns of that kind are additionally used to enhance the level of safeguard against forgery in relation to optical-diffraction security elements which are made up of holograms and/or diffraction gratings of a mosaic-like composition.

2. Description of the Prior Art

An arrangement of the kind set forth in the opening part of this specification, in relation to optical-diffraction security elements, is known from EP-A 105 099. It describes the production of variable patterns of surface portions which have an optical diffraction effect and which are glued for example in the form of a stamp on a document and authenticate that it is genuine. When the security feature is illuminated, those surface portions are successively lit up upon rotation about an axis perpendicularly to the plane of the security feature, along a path.

PCT application WO 97/27504 discloses a surface pattern having at least two surface portions of which at least one surface portion includes a diffraction grating which is superimposed of two relief structures and which in a marked direction has the same diffraction property as a different second surface having a diffraction effect. In other directions the two surface portions exhibit a different diffraction behaviour. The two relief structures of the superimposed diffraction grating differ at least in terms of one of the parameters consisting of spatial frequency, relief shape and azimuth.

It is also known from EP-A 0 360 969 for at least one optical diffraction element of the optical-diffraction authenticity feature to be subdivided into two surface portions whose microscopically fine asymmetrical diffraction gratings only differ in terms of azimuth through 180°, with the other grating parameters otherwise being the same. With those subdivided diffraction elements, machine-readable information can be inconspicuously disposed in a visually perceptible pattern.

The above-listed documents describe security elements without effectively utilising brightness modulation within relatively large areas which can be well perceived by the naked human eye.

In addition EP-A 0 401 466 describes a plastic laminate with embedded, microscopically fine, optically effective relief structures and the use thereof as a security element. The materials which can be used are known for example from EP 0 201 323 B1.

OBJECTS AND SUMMARY OF THE INVENTION

The object of the invention is to provide an inexpensive surface pattern which is difficult to forge even with holographic copying processes, with a new authenticity feature which is readily visible even in diffuse light, for optical-diffraction security elements.

In accordance with the invention that object is attained by the features recited in the characterising portions of claims 1 and 2. Advantageous configurations of the invention are set forth in the appendant claims.

Embodiments of the invention are described in greater detail hereinafter and illustrated in the drawings.

DETAILED DESCRIPTION OF THE INVENTION

Figure 1:
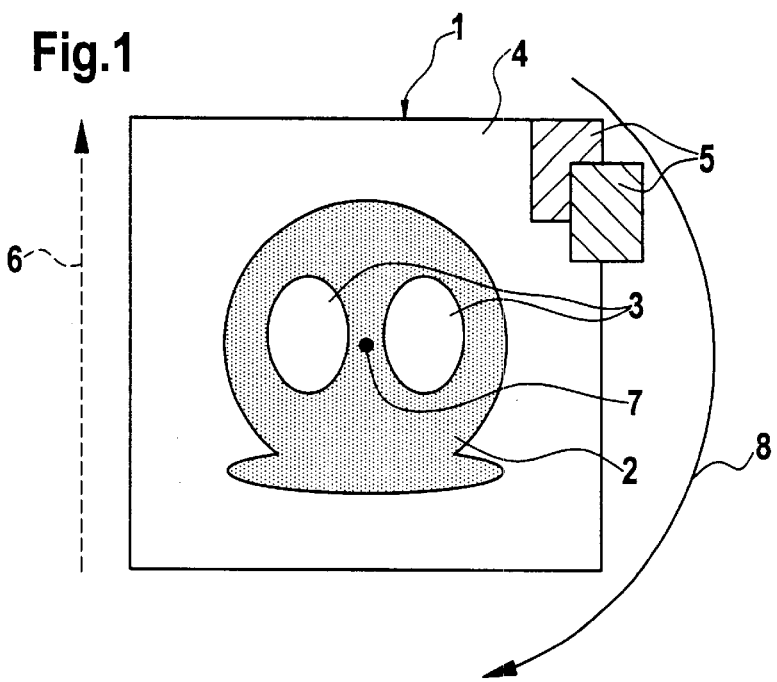
FIG. 1 shows a surface pattern.

Referring to FIG. 1, therein reference 1 denotes a surface pattern, reference 2 denotes a picture element or pixel, reference 3 denotes a surface element, reference 4 denotes a background element and reference 5 denotes further element portions which complete the mosaic-like surface pattern 1. In this example the surface element 3 and the element portions 5 are occupied by relief structures which have an optical diffraction effect or scattering microscopic relief structures (holograms, kinoforms and diffraction gratings of all kind) or have reflecting or transparent surfaces. The outer boundary and number of all elements 2 to 5 of the surface pattern 1 are not subject to any limitation. The pixel 2 and the background element 4 each have a respective diffraction grating B ($F_1$, $F_2$, $\Delta\phi$) with the grating vector G which is produced by a superimposition of at least two relief structures $F_1$, $F_2$ and whose grating vectors $G_1$, $G_2$ are oriented in substantially parallel and anti-parallel relationship respectively with a marked axis 6. The properties of the diffraction gratings and the illustration of the grating vectors $G_1$, $G_2$ are described in above-mentioned PCT specification WO 97/27504. The spatial frequency $f_1$ of the relief structure $F_1$ is less than the spatial frequency $f_2$ of the relief structure $F_2$. The relief structure $F_2$ has a relative phase shift $\Delta\phi$ in relation to the relief structure $F_1$. The relative phase shift $\Delta\phi$ of the diffraction grating B ($F_1$, $F_2$, $\Delta\phi$) can be of a constant value in the entire field of the pixel 2 and/or in the field of the background element 4, in which case the values in respect of the pixel 2 and the background element 4 differ markedly (that is to say more than 20° modulo 360°), for example $\Delta\phi$=45°, 90°, 180°, 270°, etc. The diffraction gratings B ($F_1$, $F_2$, $\Delta\phi$) of the picture and background elements 2, 4 behave optically differently from the relief structures used in the surface elements and element portions 3, 5.

Preferably, the relief structures used in the surface elements and element portions 3, 5 do not divert any light which is incident on the surface element 1, in the directions of the radiation which is diffracted by the diffraction gratings B ($F_1$, $F_2$, $\Delta\phi$).

In the surface element 1 the diffraction grating B ($F_1$, $F_2$, $\Delta\phi$) is produced for example from the relief structures $F_1$ and $F_2$ whose profiles in cross-section are sine functions. The ratio $V_F$ of the spatial frequency $f_2$ of the second sine function (relief structure $F_2$) to the spatial frequency $f_1$ of the first sine function (relief structure $F_1$), that is to say $V_F=f_2/f_1$, is advantageously selected from the range $1.5 \leq V_F \leq 3$ and the ratio $V_A$ of the amplitude $A_2$ of the second sine function to the amplitude $A_1$ of the first sine function ($V_A=A_2/A_1$) is selected from the range between 0.1 and 10. The period of the superimposed relief structure $F_1+F_2$ or the spatial frequency of the diffraction grating B ($F_1$, $F_2$, $\Delta\phi$) is equal to the lower one of the two spatial frequencies $f_1$, $f_2$, here the spatial frequency $f_1$ of the first sine function. Instead of the spatial frequency $f_2$ of the second relief structure $F_2$ being selected from the range $1.5 \leq V_F \leq 3$, it is also possible to select a higher spatial frequency $f_2'$ which is harmonic in relation to the spatial frequency $f_2$.

By way of example, the two relief structures $F_1=A_1\cdot\sin(Kx)$ and $F_2=A_2\cdot\sin(2\cdot Kx+90°)$ with the amplitude $A_1=50$ nm and the amplitude $A_2=25$ nm=½$A_1$ produce the diffraction grating $B_B$ ($F_1$, $F_2$, 90°) for the pixel 2. The background element 4 has the diffraction grating $B_H$ ($F_1$, $F_2$, 0°) whose parameters are the same, except for the relative phase shift $\Delta\phi$. The grating vectors $G_1$, $G_2$ and therefore also the grating vector $G_B$ of the diffraction grating $B_B$ ($F_1$, $F_2$, 90°) and the grating vector $G_H$ of the diffraction grating $B_H$ are directed to the marked axis 6. With polychromatic light incident perpendicularly on to the surface pattern 1, an observer who views the surface pattern 1 with the naked eye sees at least the light which is diffracted at the structures of the pixel 2 and the background element 4 when the viewing direction is in a plane, the diffraction plane, which is defined by the incident light and the axis 6, and a diffraction order coincides with the viewing direction. The relief structures used for the surface elements 3 and for the element portions 5 involve different visibility conditions, for example which are to be found in above-mentioned EP-A 105 099, and are possibly visible in the form of matt surfaces. As the two diffraction gratings $B_B(F_1, F_2, 90°)$ and $B_H(F_1, F_2, 0°)$ have the same spatial frequency, the observer sees the two surfaces of the pixel 2 and the background element 4 in the same color, for example green. In the construction selected by way of example, the relief structure $F_2$ is the first harmonic in relation to the relief structure $F_1$. The diffraction grating $B_B$ ($F_1$, $F_2$, 90°) of the pixel 2 is therefore substantially symmetrical and deflects the diffracted, perpendicularly incident light at the same level of intensity into the positive and into the negative diffraction orders at the same diffraction angles. The diffraction grating $B_B(F_1, F_2, 0°)$ used in the background element 4 is asymmetrical and prefers the positive diffraction orders. The background element 4 involves a lower level of brightness than the pixel 2 if a component of the viewing direction is in the direction of the marked axis 6. However the level of brightness of the background element 4 is greater than that of the pixel 2 when the one component of the viewing direction is opposite to the direction of the marked axis 6, that is to say after a rotation in the direction of the arrow 8 through 180° about an axis of rotation 7 which is notionally perpendicular to the plane of the surface pattern 1. In FIG. 1 for example the background element 4 is more intensive (shown lighter in the drawing) than the pixel 2. The two elements 2 and 4 serve relative to each other as a reference which helps the observer to judge the brightness distribution in the two elements 2 and 4. A plurality of background elements 4 and pixels 2 which at least in pairs have a marked axis 6 which is different from the others can be arranged in the surface pattern 1.

Figure 2:
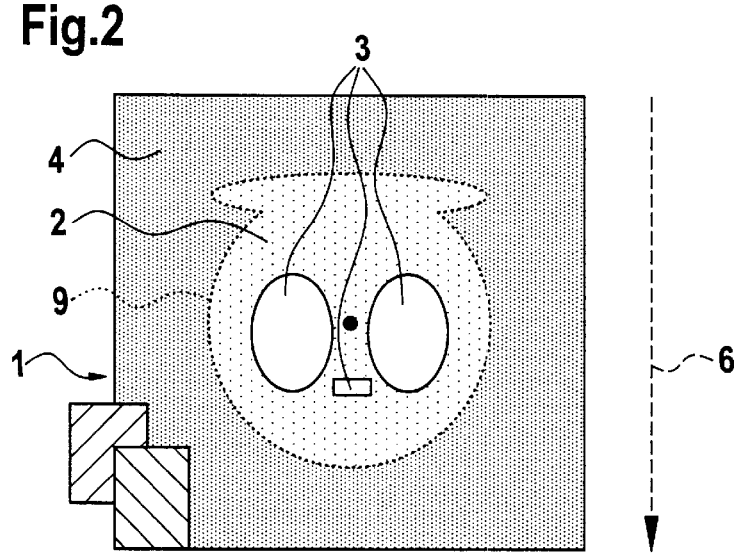
FIG. 2 shows the surface pattern turned through an angle of rotation α=90°.

FIG. 2 shows the surface pattern 1 after the 180° rotation about the axis of rotation 7. The background element 4 is now substantially less intensive than the pixel 2. That variation in the brightness of the surfaces of the background elements 4 relative to those of the pixal 2 is easy to detect even with diffuse light incidence. That is shown by different shading in the drawing. The observer can check the authenticity feature of the surface pattern 1 by viewing the surface pattern 1 in the direction of the axis 6 or in opposite relationship to that direction, under otherwise identical conditions. If the incident light is polychromatic, then the surfaces of the background elements 4 and the pixel 2 appear to the observer as being of the same color but with a marked contrast in terms of brightness, which is clearly visible in particular at a boundary 9 between the two elements 2 and 4. The contrast in the brightness changes depending on whether the surface pattern 1 is being viewed in the direction of the axis 6 or in opposite relationship to that direction, under otherwise equal conditions. The pixel 2 and the background element 4 are only visible in a relatively narrow range rA from the azimuth of the diffraction plane (that is to say in the range 0°±rA and 180°±rA), that is to say parallel to the axis 6, as is generally known from linear diffraction gratings. The elements 2 and 4 are matt in the remaining regions of the azimuth, but the surface elements 3 and/or the element portions 5 can light up.

A use of this novel authenticity feature in the surface element 1 affords the advantages that it is clearly discernible in particular with weak illumination and also with diffuse incident light, that it can be easily detected by the man in the street without auxiliary aids, and that it can be copied with holographic methods only at very great cost, if at all.

The brightness of the pixel 2 is to be inconspicuously weakened by means of the surface elements 3. If there are arranged in the surface of the pixel 2 a plurality of the very small surface elements 4 whose dimensions do not exceed the size (0.3 mm) referred to in EP-A 0 330 738 and which as reflecting or scattering surface elements 3 project no light or only light with a very low level of intensity in the viewing direction of the observer. By way of example the surface elements 4 can be in the form of reflecting microscripts. With a predetermined surface proportion of the surface elements 3 within the pixel 2, in that way the brightness of the pixel 2 can be lowered to the value of the brightness of the background element 4 so that the contrast between the pixel 2 and the background element 4 disappears at a boundary 9 of the pixel 2, as is shown here in a dotted line, and the pixel 2, of the same color, can no longer be perceived in relation to the background element 4. After a further 180° rotation the contrast at the boundary 9 in FIG. 1 is again at its maximum, with the brightness of the pixel 2 remaining at the value reduced by the surface 4.

Figure 3:
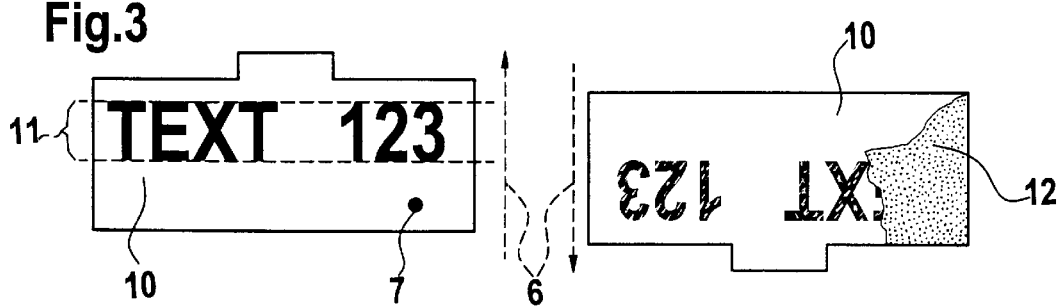
FIG. 3 shows the second pixel with script band at 0° and 180°.

FIG. 3 shows a script field or area 10 with a script band 11 with surfaces which represent alphanumeric characters and which are occupied by the diffraction grating $B_H(F_1, F_2, 0°)$. The area 10 corresponds to the pixel 2 with the diffraction grating $B_B(F_1, F_2, 90°)$ while the surfaces of the script band 11 with the diffraction grating $B_H(F_1, F_2, 0°)$ behave like the background area 4 (FIG. 1) upon rotation through 180°. In the left-hand part of the drawing in FIG. 3, that is to say prior to the 180° rotation about the axis of rotation 7, the script band 11 is bright in the same color against the script area 10. In the right-hand part in FIG. 3, that is to say after the 180° rotation about the axis of rotation 7, the script band 11 is darker in the same color than the script area 10 which is uniformly occupied by the diffraction grating $B_B(F_1, F_2, 90°)$. If once again the surface elements 3 (FIG. 2) are used to darken the script area 10, the brightness of the script area 10 can be so adapted to that of the script band 11 that the text is readable prior to rotation through 180°, but not after the rotation through 180°. As in the description relating to FIG. 2, in the right-hand part in FIG. 3 the contrast at the boundaries 9 (FIG. 2) of the alphanumeric characters of the script band 11 disappears in a darkening zone 12 between the area 10 and the script band 11. The script band 11 is no longer perceived against the script area 10 of the same color, when the levels of brightness are substantially the same. Conversely, in the left-hand part in FIG. 3, that is to say prior to the 180° rotation about the axis of rotation 7, the contrast between the script band 11 and the script area 10 is increased corresponding to the degree of darkening in the script area 10.

Figure 4:
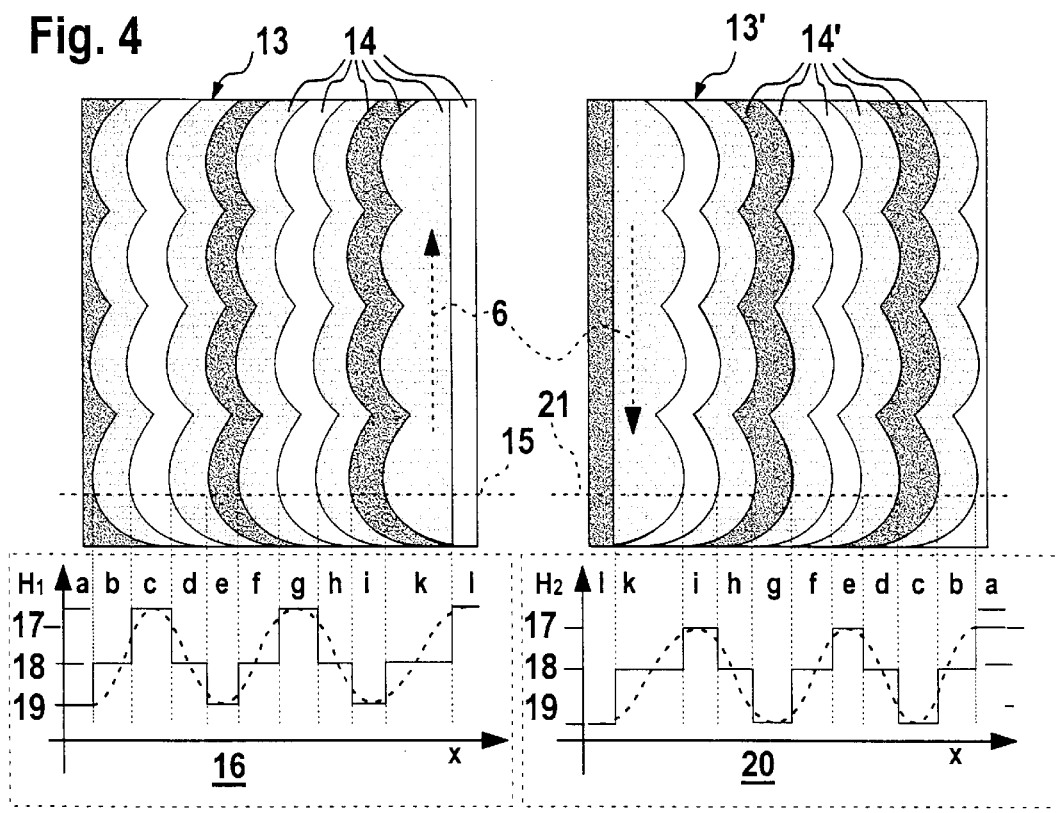
FIG. 4 shows a pattern with a locally varying phase shift.

The left-hand part of FIG. 4 shows a pattern 13 with a plurality of the pixels 2 (FIG. 1) and the background elements 4 (FIG. 1) arranged alternately, wherein a wave-shaped division of the pattern 13 is afforded by wavy parallel bands 14 which all involve the same diffraction grating $B(F_1, F_2, \Delta\phi)$ and whose grating vectors $G_B$ are oriented parallel to the marked axis 6. Along a line 15 which intersects the bands, the bands 14 of the pattern 13 are divided into regions a to I, as are identified beneath the pattern 13 by the letters a to I. The relative phase shift $\Delta\phi$ varies in the bands 14 along the line 15 stepwise correspondingly to the identifications a to I. The brightness of the bands 14 and the relative phase shift $\Delta\phi$ in each of the bands 14 are summarised in Table 1.

TABLE 1

| Band region | a | b | c | d | e | f | g | h | i | k | l |
|---|---|---|---|---|---|---|---|---|---|---|---|
| Pixel (2) | — | yes | — | yes | — | yes | — | yes | — | yes | — |
| Background (4) | yes | — | yes | — | yes | — | yes | — | yes | — | yes |
| $\Delta\phi$: | 0° | 90° | 180° | 270° | 0° | 90° | 180° | 270° | 0° | 90° | 180° |
| Brightness: | dark | med | light | med | dark | med | light | med | dark | med | light |

[med = medium]
[background (4) = background element (4)]

Shown beneath the pattern 13 in a first graph 16 is the relative brightness of the bands 14 as a function of the distance x along the line 15. The contrast, that is to say the transition from one of the bands 14 to the other, follows the solid stepped first brightness function $H_1(x)$ which ranges between a high value 17 of relative brightness (='light'), a medium value 18 (='medium') and a low value 19 of relative brightness (='dark').

The right-hand part of FIG. 4 shows the pattern 13' after the 180° rotation about the axis of rotation 7 (FIG. 1). The brightnesses of the background elements 4 are interchanged. The brightness of the pixels 2 remains the same prior to and after the 180° rotation about the axis of rotation 7. Beneath the turned pattern 13' shown in a second graph 20 is the relative brightness of the bands 14' as a function of the distance x along the line 21. The contrast, that is to say the transition from one of the bands 14' to the other, follows the solid stepped second brightness function $H_2(x)$ which clearly shows the change of brightness in the pattern 13'. The regions b, d, f, h and k with the medium values 18 form the reference for the brightness change in the regions a, c, e, g and I.

Shown in dotted line in the graphs 16 and 20 respectively is the brightness function $H_1(x)$ and $H_2(x)$ respectively, which causes a simple steady function in respect of the relative phase shift $\Delta\phi(x)$. If in the pattern 13 and 13' respectively the relative phase shift $\Delta\phi(x)$ periodically changes between 0° and 360°, for example as a sine function, the brightness function $H_1(x)$ and $H_2(x)$ also becomes steady and periodic (dotted-line function configuration). The contrast between the bands 14 occurs in a continuous transition and no longer in steps. From the point of view of the observer the regions b, d, f, h and k with the medium values 18 shrink somewhat, but still form the reference for the brightness change in the regions a, c, e, g and I. The bands 14, 14' in FIG. 4 are all visible in the same color and differ only in terms of their brightness.

The simple steady function of the relative phase shift $\Delta\phi(x)$ is to be found for example in the diffraction grating $B(F_1, F_2, \Delta\phi)$ whose relief structure $F_1$ has a sinusoidal profile in cross-section. The spatial frequency $f_1$ of the first relief structure $F_1$ varies slowly over the pattern 13, 13' along the line 15 and 21 respectively, wherein successive maxima of the brightness function $H_1(x)$ and $H_2(x)$ respectively occur when the relief structures $F_1$ and $F_2$ are in phase.

In an example, in the case of the first relief structure $F_1$ the spatial frequency $f_1$ is 1006 lines/mm with a frequency change (='frequency chirp') of 6% of the spatial frequency $f_1$ over 100 mm. The maxima of the observed brightness function $H_1(x)$ and $H_2(x)$ are 1.8 mm apart. The second relief structure $F_2$ has the constant spatial frequency $f_2$ of 2012 lines/mm.

Figure 5:
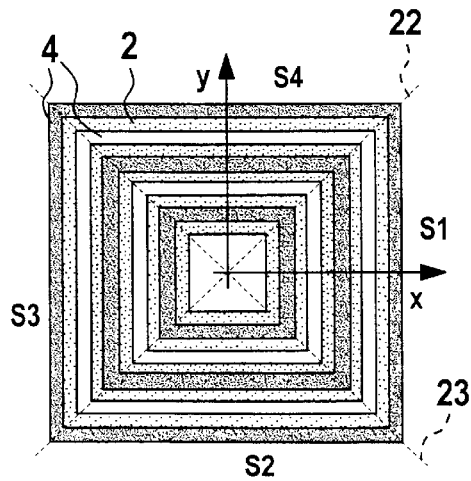
FIG. 5 shows another pattern with the phase shift which varies from a central point.

FIG. 5 shows mutually interlocked rectangles as patterns 13, the y-axis being parallel to the marked axis 6 (FIG. 1). The brightness distribution shown by gray stages in the drawing in FIG. 5 changes in the 180° rotation of the surface pattern 1 (FIG. 1) about the axis of rotation 7, in which respect, in the rotated pattern 13' which is not shown here (see FIG. 4), the surfaces shown in white of the one background elements 4 are to be shown as darkly toned-down surfaces of the other background elements 4 and the darkly toned-down surfaces of the other background elements 4 are to be shown as white ones, while the mediumly toned-down surfaces of the pixels 2 remain unchanged. Notional lines 22 and 23 delimit the four sectors S1 to S4 of the pattern 13. In the sectors S1 and S3 the relative phase shift $\Delta\phi(x)$ changes in the direction of the x-axis and in opposite relationship thereto respectively. In the sector S2 and S4 respectively the relative phase shift $\Delta\phi$ changes as a function of y in the direction of the negative y-axis and in the direction of the positive y-axis. If that sector division is sufficiently fine, the pattern 13 is transformed into mutually interlocked circular rings and the relative phase shift $\Delta\phi$ changes from a center radially outwardly.

Such a substantially radially changing relative phase shift $\Delta\phi(x,y)$ is produced by the superimposition of the relief structure $F_1$ with the spatial frequency $f_1=1006$ lines/mm, which changes by 0.6 period/mm, and the relief structure $F_2$ with the spatial frequency $f_2$ of 2012 lines/mm, when the grating vectors $G_1$ and $G_2$ of the relief structures $F_1$, $F_2$ include a very small angle $\alpha(0°\leq\alpha\leq10°)$. The angle $\alpha$ and the frequency change in the spatial frequency $f_1$ are to be precisely matched if a relative phase shift $\Delta\phi(r)$ is to be produced. The viewer sees in FIG. 6 on the surface pattern 1 (FIG. 1) the pattern 13 which, starting from the center, has the relative phase shift $\Delta\phi(r)$, comprising concentric circular rings of the same color but entailing different degrees of brightness. After a rotation through 180° the pattern 13' lights up again in perpendicularly incident polychromatic light, but the maxima and minima of the brightness of the concentric circular rings are interchanged. In the entire pattern 13 the grating vectors $G_B$ are substantially parallel to the marked axis 6.

The picture and background elements 2 (FIG. 1) and 4 (FIG. 1) which are occupied by the diffraction gratings B ($F_1$, $F_2$, $\Delta\phi$) are highly effective in terms of representing shading and shiny locations in relation to band loops or other images which in the two-dimensional surface pattern 1 (FIG. 1) simulate three-dimensional bodies. In particular the picture and background elements 2 and 4 which are occupied with the diffraction gratings B ($F_1$, $F_2$, $\Delta\phi$) can produce the patterns 13 which are described in the application filed by the present applicants on the same date at the Swiss Federal Institute for Intellectual Property.

Figure 7:
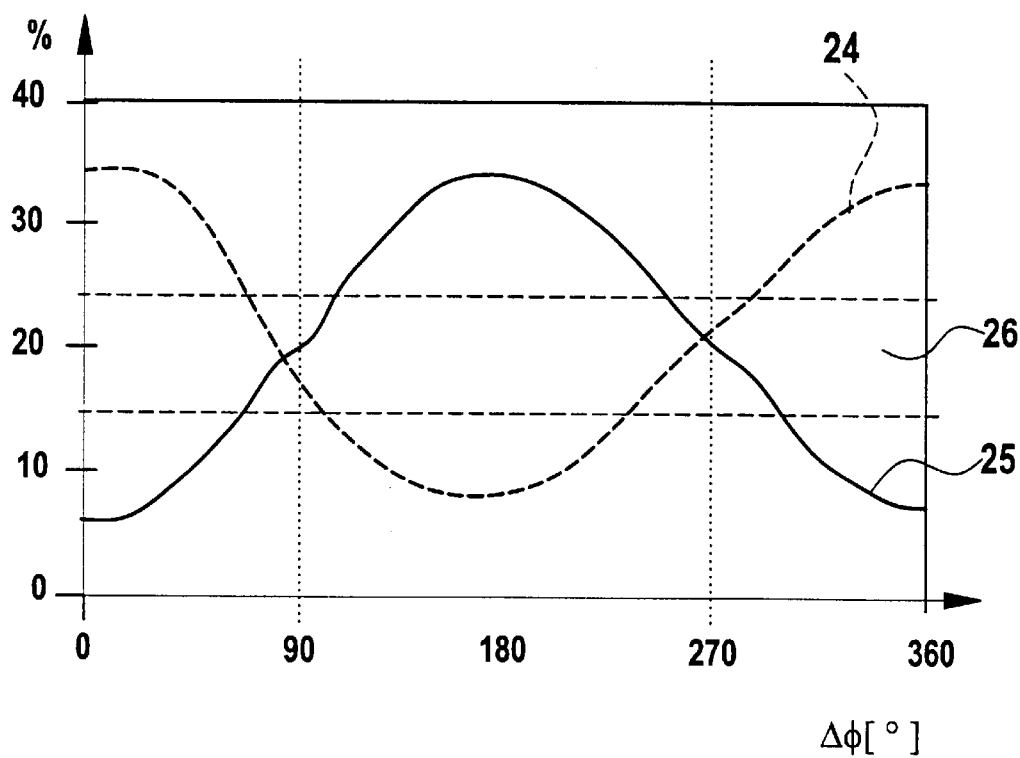
FIG. 7 shows the diffraction efficiency and the relative phase shift.

The described diffraction gratings B ($F_1$, $F_2$, $\Delta\phi$) for the relative phase shifts $\Delta\phi$ have different diffraction efficiencies for light which is incident in a polarised mode. If the incident light swings parallel to the channel lines of the diffraction grating B ($F_1$, $F_2$, $\Delta\phi$), that is to say in the case of TE-polarisation, the relative diffraction efficiency is a function of the relative phase shift $\Delta\phi$, as FIG. 7 shows. The TE-diffraction efficiency of the +1st diffraction order in percent follows a cos ($\Delta\phi$)-function 24 and has for $\Delta\phi = 0°$ and 360° respectively a maximum, and the diffraction efficiency of the −1st diffraction order is at a minimum there as a sin ($\Delta\phi$)-function 25. The asymmetry disappears for the values $\Delta\phi=90°$ and 270°. If the incident light moves perpendicularly to the channel lines of the diffraction grating B ($F_1$, $F_2$, $\Delta\phi$), that is to say in the case of TM-polarisation, the asymmetry of the diffraction efficiency in percent is substantially less and ranges in a band width 26 of about ±5% around the value 20%. Upon consideration of the surface pattern 1 (FIG. 1) with incident unpolarised light the asymmetry of the diffraction grating B ($F_1$, $F_2$, $\Delta\phi$) is less pronounced. Upon consideration of the surface pattern 1 through a polarisation filter, the brightness change in the 180° rotation can be increased if, in the case of incident unpolarised light, the component of the TM-polarisation is filtered out. At this point attention is expressly directed to as yet unpublished application PCT/EP97/04608 with a priority date of Sep. 4, 1996.

Figure 8:
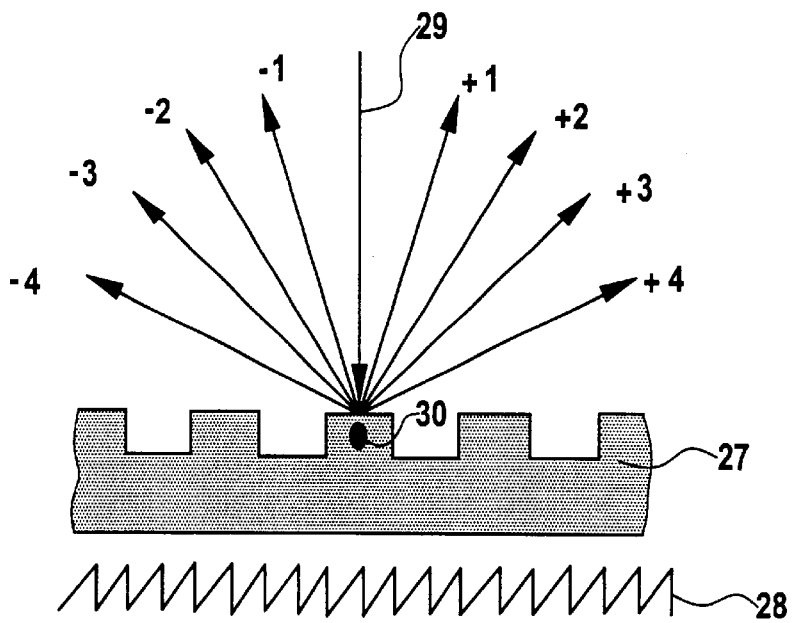
FIG. 8 shows diffraction orders.

FIG. 8 shows a rectangular function 27 and an asymmetrical sawtooth function 28. The diffraction grating B ($F_1$, $F_2$, $\Delta\phi$) has a relief structure which involves a superimposition of the first relief structure $F_1$, the rectangular function 27, and the second relief structure $F_2$, the asymmetrical sawtooth function 28. The relative phase shift $\Delta\phi$ again considerably influences the diffraction behaviour of the diffraction grating B ($F_1$, $F_2$, $\Delta\phi$). Table 2 sets out the asymmetry values measured in polarised light 29 of the wavelength 632.8 nm, that is to say the relationship of the intensity in the diffraction order +1 to the intensity in the diffraction order −1, in dependence on the relative phase shift $\Delta\phi$.

TABLE 2

| Relative phase shift $\Delta\phi$ | 0° | 45° | 90° |
|---|---|---|---|
| +1st diffraction order TE | 12.9 | 1.8 | 7.7 |
| −1st diffraction order TE | 2.9 | 15.8 | 14.3 |
| Asymmetry: | 4.4 | 0.1 | 0.5 |

Figure 6:
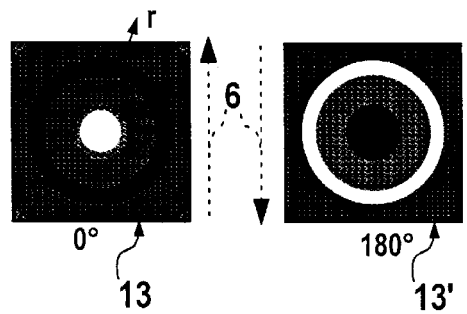
FIG. 6 shows another pattern with a radially varying phase shift.

The surface patterns 1 (FIG. 1) described hitherto can in another embodiment also have the diffraction grating B ($F_1$, $F_2$, $\Delta\phi$) produced from the rectangular function 27 and the sawtooth function 28, for the picture and background elements 2 (FIG. 1) and 4 (FIG. 1) or the patterns 13 FIG. 6). The relationship of the spatial frequency $f_2$ of the asymmetrical sawtooth function 28 to the spatial frequency $f_1$ of the rectangular function 27 is to be selected from the range of between 2 and 5 while the relationship of the profile height $P_2$ of the asymmetrical sawtooth function 28 to the profile height $P_1$ of the rectangular function 27 is in the range of between 1 and 4. The relative phase shift $\Delta\phi$ between the first relief structure $F_1$ and the second relief structure $F_2$ determines whether the diffraction grating B ($F_1$, $F_2$, $\Delta\phi$) symmetrically or asymmetrically diffracts the light 29 which is incident perpendicularly on the surface pattern 1.

The relief structures $F_1$ and $F_2$ of the diffraction grating B ($F_1$, $F_2$, $\Delta\phi$) in the example for the measurement values in Table 2 show for the first relief structure $F_1$ a constant spatial frequency $f_1=259$ lines/mm and a profile height $P_1$ of 200 nm; for the second relief structure $F_2$ the spatial frequency $f_2$ is 1036 lines/mm with a profile height $P_2$ of 200 nm with a blaze angle of 17°. Advantageously the second spatial frequency $f_2$ may also have a low 'frequency chirp' so that the relative phase shift of $\Delta\phi=0°$ changes to $\Delta\phi=180°$ on a distance over the surface pattern 1 of 2.8 mm.

In the case of a pattern 13 (FIG. 6), the brightness pattern changes, upon tilting about a tilt axis 30 which is parallel to the channel lines of the B ($F_1$, $F_2$, $\Delta\phi$), from one diffraction order to another, identified by the integers of −4 to +4. For example the contrast is intensive at the +3rd order, it is quite weak at the +2nd order, at the +1st order the contrasts are again intensive but the brightness distribution is interchanged as in the case of the pattern 13' (FIG. 6). In specific cases the brightness distributions can be reflected in the negative diffraction orders, the −1st order corresponds to the +3rd order and the −3rd order corresponds to the +1st order. Thus there is also the change in brightness distribution upon the 180° rotation in the plane of the pattern 13.

It is to be noted that in the drawings the relative brightness distributions which an observer sees at the corresponding viewing direction are illustrated by means of gray scales in the pixels 2 and the backgrounds elements 4 respectively, but not in the elements 3 and 5 which are possibly shown. The marked axis 6 shows the relative position of the surface pattern 1. The term 'brightness' always means the surface brightness, that is to say the level of intensity of the diffracted light sent in the viewing direction, per unit of area of the diffracting elements 2 to 5.

What is claimed is:

1. A surface pattern comprising elements arranged in a mosaic-like fashion and of which at least a background element and a pixel have microscopically fine diffraction gratings B diffracting visible light comprising a superimposition of at least two different relief structures $F_1$, $F_2$ and surface elements and element portions either contain the microscopically fine relief structures diffracting visible light or comprise reflecting or scattering surfaces, wherein a first diffraction grating $B_B\{F_1, F_2, \Delta\phi_B\}$ is arranged in the pixel and a second diffraction grating $B_H\{F_1, F_2, \Delta\phi_H\}$ is arranged in the background element, the diffraction gratings $B_B$ and $B_H$ each have a superimposed relief structure $F_1+F_2$, wherein $F_1$ is a first relief structure having the spatial frequency $f_1$ and $F_2$ is a second relief structure having the spatial frequency $f_2$ and $\Delta\phi$ is a relative phase shift of the second relief structure $F_2$ with respect to the first relief structure $F_1$ and the spatial frequency of the diffraction grating $B_B$ and that of the diffraction grating $B_H$ are equal to the lower of the two spatial frequencies $f_1$ and $f_2$ the relationship $V_F$ of the second to the first spatial frequencies $f_2/f_1$ is of a value from the range $1.5 \leq V_F \leq 3$, the grating vectors of the first diffraction grating $B_B$ in the pixel and the second diffraction grating $B_H$ in the background element as well as the grating vectors of the two relief structures $F_1$, $F_2$, are oriented in substantially parallel or anti-parallel relationship to a marked axis, and the first diffraction grating $B_B$ and the second diffraction grating $B_H$ differ only by the relative phase shift $\Delta\phi$ of the second relief structure $F_2$ which is used for superimposition with the first relief structure $F_1$.

2. A surface pattern according to claim 1, wherein the relative phase shift $\Delta\phi$ of each diffraction grating $B_B$ and $B_H$, in the entire area of the pixel and the background element respectively, is of a constant value.

3. A surface pattern according to claim 2, wherein the values of the relative phase shift $\Delta\phi$ of the diffraction gratings $B_B$ and $B_H$ differ by more than 20° modulo 360°.

4. A surface pattern according to claim 1, wherein a plurality of the pixels and the background elements are arranged alternately, the grating vectors of all diffraction gratings $B\{F_1, F_2, \Delta\phi\}$ of the pixels and the background elements oriented towards the axis and the relative phase shift $\Delta\phi$ in the transition from one element to the adjacent element changes stepwise by a predetermined value.

5. A surface pattern according to claim 1, wherein the relief structures $F_1$, $F_2$ are sine functions, and wherein the relationship of the amplitude $A_2$ of the second sine function to the amplitude $A_1$ of the first sine function is in the range of between 0.1 and 10.

6. A surface pattern according to claim 5, wherein the spatial frequency $f_1$ has a 'frequency chirp' of 6% of the spatial frequency $f_1$ over 100 mm.

7. A surface pattern according to claim 6, wherein the grating vectors of the two relief structures $F_1$ and $F_2$ include an angle of less than 10°.

8. A surface pattern according to claim 6, wherein the relief structures $F_1$, $F_2$ are sine functions, wherein the relationship of the spatial frequency $f_2$ of the second sine function to the spatial frequency $f_1$ of the first sine function is in the range of between 1.5 and 3 and the relationship of the amplitude $A_2$ of the second sine function to the amplitude $A_1$ of the first sine function is in the range of between 0.1 and 10.

9. A surface pattern according to claim 1, wherein the first relief structure $F_1$ is a rectangular function and the second relief structure $F_2$ is an asymmetrical sawtooth function wherein the relationship of the spatial frequency $f_2$ of the asymmetrical sawtooth function to the spatial frequency $f_1$ of the rectangular function is in the range of between 2 and 5 and the relationship of the profile height $P_2$ of the asymmetrical sawtooth function to the profile height $P_1$ of the rectangular function is in the range of between 1 and 4.

10. A surface pattern according to claim 9, wherein upon tilting about a tilt axis parallel to channel lines of the diffraction structures B and upon illumination with perpendicularly incident light the surfaces of the pixels, which are occupied with the diffraction structures B, have a predetermined change in the brightness which occurs in comparison with the surfaces of the background elements, which are occupied by the diffraction structures, wherein the pixels and the background elements are each of the same respective color or spatial frequency.

11. A surface pattern according to claim 1, wherein arranged in the surfaces of the pixels are a plurality of small surface elements which cannot be discerned by the naked eye, with a different optical behavior from the diffraction structure B, in order to reduce the brightness of the pixels.

12. A surface pattern according to claim 1, wherein a contrast between the pixels and the background elements only disappears with polarized light and the contrast is retained with unpolarized light.

13. A surface pattern according to claim 1, wherein a contrast between the pixels and the background elements only disappears in unpolarized light and the contrast is retained with polarized light.

14. A surface pattern comprising elements arranged in a mosaic-like fashion and of which at least a pixel has a microscopically fine diffraction grating B diffracting visible light comprising a superimposition of at least two relief structures and the other elements either contain the microscopically fine relief structures diffracting visible light or comprise reflecting or scattering surfaces, wherein the diffraction grating B has a superimposed relief structure $F_1+F_2$, wherein $F_1$ is a first relief structure having the spatial frequency $f_1$ and $F_2$ is a second relief structure having the spatial frequency $f_2$ and $\Delta\phi$ is a relative phase shift of the second structure $F_2$ with respect to the first relief structure $F_1$ and the spatial frequency of the diffraction grating B is equal to the lower of the two spatial frequencies $f_1$ and $f_2$, the relative phase shift $\Delta\phi(x,y)$, between the relief structure $F_1$ and the relief structure $F_2$ of the diffraction grating B, varies as a location-dependent function which is steady in a portion-wise manner, and the diffraction grating B and the relief structures $F_1$, $F_2$ have grating vectors which are substantially parallel to a marked axis.

15. A surface pattern according to claim 14, wherein the diffraction grating B, from at least one center, further has a location-dependent radial function, which is steady in a portion-wise manner, of the relative phase shift $\Delta\phi(r)$ between the relief structure $F_1$ and the relief structure $F_2$.

16. A surface pattern according to claim 14, wherein the spatial frequency $f_1$ has a 'frequency chirp' of 6% of the spatial frequency $f_1$ over 100 mm.

17. A surface pattern according to claim 16, wherein the grating vectors of the two relief structures $F_1$ and $F_2$ include an angle of less than 10°.

18. A surface pattern according to claim 14, wherein the relief structures $F_1$, $F_2$ are sine functions, wherein the relationship of the spatial frequency $f_2$ of the second sine function to the spatial frequency $f_1$ of the first sine function is in the range of between 1.5 and 3 and the relationship of the amplitude $A_2$ of the second sine function to the amplitude $A_1$ of the first sine function is in the range of between 0.1 and 10.

19. A surface pattern according to claim 14, wherein the first relief structure $F_1$ is a rectangular function and the second relief structure $F_2$ is an asymmetrical sawtooth function wherein the relationship of the spatial frequency $f_2$ of the asymmetrical sawtooth function to the spatial frequency $f_1$ of the rectangular function is in the range of between 2 and 5 and the relationship of the profile height $P_2$ of the asymmetrical sawtooth function to the profile height $P_1$ of the rectangular function is in the range of between 1 and 4.

20. A surface pattern according to claim 19, wherein upon tilting about a tilt axis parallel to channel lines of the diffraction structures B and upon illumination with perpendicularly incident light the surfaces of the pixels, which are occupied with the diffraction structures B, have a predetermined change in the brightness which occurs in comparison with the surfaces of the background elements, which are occupied by the diffraction structures, wherein the pixels and the background elements are each of the same respective color or spatial frequency.

21. A surface pattern according to claim 14, wherein arranged in the surfaces of the pixels are a plurality of small surface elements which cannot be discerned by the naked eye, with a different optical behavior from the diffraction structure B, in order to reduce the brightness of the pixels.

22. A surface pattern according to claim 14, wherein a contrast between the pixels and the background elements only disappears with polarized light and the contrast is retained with unpolarized light.

23. A surface pattern according to claim 14, wherein a contrast between the pixels and the background elements only disappears in unpolarized light and the contrast is retained with polarized light.

* * * * *

UNITED STATES PATENT AND TRADEMARK OFFICE
CERTIFICATE OF CORRECTION

PATENT NO.    : 6,324,004 B1
DATED         : November 27, 2001
INVENTOR(S)   : Staub et al.

It is certified that error appears in the above-identified patent and that said Letters Patent is hereby corrected as shown below:

<u>Column 4,</u>
Line 27, now reads "surface elements 4" should read -- surface elements 3 --;
Line 32, now reads "elements 4" should read -- elements 3 --;
Line 43, now reads "by the surface 4" should read -- by the surface elements 3 --.

Signed and Sealed this

Third Day of September, 2002

Attest:

Attesting Officer

JAMES E. ROGAN
Director of the United States Patent and Trademark Office